(12) United States Patent
Raghavan et al.

(10) Patent No.: US 6,626,790 B2
(45) Date of Patent: Sep. 30, 2003

(54) FAMILY OF FIVE-SPEED TRANSMISSION MECHANISMS HAVING THREE INTERCONNECTED PLANETARY GEAR SETS

(75) Inventors: Madhusudan Raghavan, West Bloomfield, MI (US); Chunhao J. Lee, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 6 days.

(21) Appl. No.: 10/082,383

(22) Filed: Feb. 25, 2002

(65) Prior Publication Data
US 2003/0162626 A1 Aug. 28, 2003

(51) Int. Cl.$^7$ .............................. F16H 3/62; F16H 3/44
(52) U.S. Cl. ........................................ 475/277; 475/282
(58) Field of Search ................................ 475/275–279, 475/282, 288, 290

(56) References Cited

U.S. PATENT DOCUMENTS

| | | | |
|---|---|---|---|
| 3,863,524 A | * 2/1975 | Mori et al. ............. 475/276 X |
| 4,070,927 A | 1/1978 | Polak ........................... 74/765 |
| 5,106,352 A | 4/1992 | Lepelletier .................. 475/280 |
| 5,599,251 A | 2/1997 | Beim et al. .................. 475/275 |
| 5,692,988 A | 12/1997 | Beim et al. .................. 475/281 |
| 5,711,735 A | * 1/1998 | Park ........................ 475/275 X |
| 5,755,636 A | * 5/1998 | Justice et al. ................ 475/275 |
| 5,879,264 A | 3/1999 | Raghavan et al. ........... 475/280 |
| 5,951,432 A | 9/1999 | Wehking et al. ............. 475/280 |
| 5,984,825 A | 11/1999 | Hebbale et al. .............. 475/286 |
| 5,997,429 A | 12/1999 | Raghavan et al. ........... 475/280 |
| 6,007,450 A | 12/1999 | Raghavan et al. ........... 475/286 |
| 6,053,839 A | 4/2000 | Baldwin et al. ............. 475/281 |
| 6,056,665 A | 5/2000 | Raghavan et al. ........... 475/280 |
| 6,071,208 A | 6/2000 | Koivunen .................... 475/275 |
| 6,083,135 A | 7/2000 | Baldwin et al. ............. 475/276 |

FOREIGN PATENT DOCUMENTS

JP  406201000  * 7/1994 ................. 475/275

* cited by examiner

Primary Examiner—Roger Pang
(74) Attorney, Agent, or Firm—Kathryn A. Marra

(57) ABSTRACT

The family of transmissions has a plurality of members that can be utilized in powertrains to provide at least five forward speed ratios and one reverse speed ratio. The transmission family members include three planetary gear sets, two clutches and two brakes. The powertrain includes an engine and torque converter that is continuously connected with at least one member of the third planetary gear set and an output member that is continuously connected with another member of the third planetary gear set. The two clutches and two brakes provide interconnections between various gear members, the transmission housing, and with the input and the output shaft, and are operated in combinations of two to establish at least five forward speed ratios and one reverse speed ratio.

11 Claims, 6 Drawing Sheets

| | RATIOS | 50 | 52 | 54 | 56 |
|---|---|---|---|---|---|
| REVERSE | -1.06 | X | | X | |
| NEUTRAL | 0 | X | | | |
| 1 | 1.49 | X | | | X |
| 2 | 1 | | | X | X |
| 3 | 0.6 | | X | | X |
| 4 | 0.39 | | X | X | |
| 5 | 0.25 | X | X | | |

(X = ENGAGED CLUTCH)

$\frac{\text{RING GEAR}}{\text{SUN GEAR}}$ TOOTH RATIO: $\frac{R_1}{S_1} = 2.91$, $\frac{R_2}{S_2} = 1.53$, $\frac{R_3}{S_3} = 2.98$

| RATIO SPREAD | 5.93 |
|---|---|
| RATIO STEPS | |
| REV/1 | -0.71 |
| 1/2 | 1.49 |
| 2/3 | 1.67 |
| 3/4 | 1.56 |
| 4/5 | 1.54 |

| | RATIOS | 150 | 152 | 154 | 156 |
|---|---|---|---|---|---|
| REVERSE | -3.09 | | X | X | |
| NEUTRAL | 0 | | X | | |
| 1 | 4.88 | | X | | X |
| 2 | 2.93 | X | X | | |
| 3 | 1.77 | X | | | X |
| 4 | 1.36 | X | | X | |
| 5 | 1 | | | X | X |

(X = ENGAGED CLUTCH)

$\dfrac{\text{RING GEAR}}{\text{SUN GEAR}}$ TOOTH RATIO: $\dfrac{R_1}{S_1} = 3.00$, $\dfrac{R_2}{S_2} = 2.51$, $\dfrac{R_3}{S_3} = 1.93$

| RATIO SPREAD | 4.88 |
|---|---|
| RATIO STEPS | |
| REV/1 | -0.63 |
| 1/2 | 1.66 |
| 2/3 | 1.66 |
| 3/4 | 1.31 |
| 4/5 | 1.36 |

|  | RATIOS | 250 | 252 | 254 | 256 |
|---|---|---|---|---|---|
| REVERSE | -3.09 |  | X | X |  |
| NEUTRAL | 0 |  | X |  |  |
| 1 | 4.88 |  | X |  | X |
| 2 | 2.93 | X | X |  |  |
| 3 | 1.77 | X |  |  | X |
| 4 | 1.36 | X |  | X |  |
| 5 | 1 |  |  | X | X |

(X = ENGAGED CLUTCH)

$\dfrac{\text{RING GEAR}}{\text{SUN GEAR}}$ TOOTH RATIO: $\dfrac{R_1}{S_1} = 1.51$, $\dfrac{R_2}{S_2} = 3.00$, $\dfrac{R_3}{S_3} = 1.93$

| RATIO SPREAD | 4.88 |
|---|---|
| RATIO STEPS |  |
| REV/1 | -0.63 |
| 1/2 | 1.66 |
| 2/3 | 1.66 |
| 3/4 | 1.31 |
| 4/5 | 1.36 |

| | RATIOS | 350 | 352 | 354 | 356 |
|---|---|---|---|---|---|
| REVERSE | -5.07 | | X | X | |
| NEUTRAL | | | X | | |
| 1 | 5.35 | | X | | X |
| 2 | 3.63 | X | X | | |
| 3 | 1.99 | X | | | X |
| 4 | 1.38 | X | | X | |
| 5 | 1 | | | X | X |

(X = ENGAGED CLUTCH)

$\dfrac{\text{RING GEAR}}{\text{SUN GEAR}}$ TOOTH RATIO: $\dfrac{R_1}{S_1} = 1.65$, $\dfrac{R_2}{S_2} = 1.53$, $\dfrac{R_3}{S_3} = 2.63$

| RATIO SPREAD | 5.35 |
|---|---|
| RATIO STEPS | |
| REV/1 | -0.95 |
| 1/2 | 1.47 |
| 2/3 | 1.82 |
| 3/4 | 1.45 |
| 4/5 | 1.38 |

| | RATIOS | 450 | 452 | 454 | 456 |
|---|---|---|---|---|---|
| REVERSE | -5.09 | X | | X | |
| NEUTRAL | | X | | | |
| 1 | 5.35 | X | | | X |
| 2 | 3.63 | X | X | | |
| 3 | 1.98 | | X | | X |
| 4 | 1.37 | | X | X | |
| 5 | 1 | | | X | X |

(X = ENGAGED CLUTCH)

$\frac{\text{RING GEAR}}{\text{SUN GEAR}}$ TOOTH RATIO: $\frac{R_1}{S_1} = 2.54$, $\frac{R_2}{S_2} = 1.67$, $\frac{R_3}{S_3} = 2.63$

| RATIO SPREAD | 5.35 |
|---|---|
| RATIO STEPS | |
| REV/1 | -0.95 |
| 1/2 | 1.47 |
| 2/3 | 1.83 |
| 3/4 | 1.45 |
| 4/5 | 1.37 |

|  | RATIOS | 550 | 552 | 554 | 556 |
|---|---|---|---|---|---|
| REVERSE | -1.06 | X |  | X |  |
| NEUTRAL | 0 | X |  |  |  |
| 1 | 1.49 | X |  |  | X |
| 2 | 1 |  |  | X | X |
| 3 | 0.6 |  | X |  | X |
| 4 | 0.39 |  | X | X |  |
| 5 | 0.25 | X | X |  |  |

(X = ENGAGED CLUTCH)

$\frac{\text{RING GEAR}}{\text{SUN GEAR}}$ TOOTH RATIO: $\frac{R_1}{S_1} = 2.91$, $\frac{R_2}{S_2} = 2.53$, $\frac{R_3}{S_3} = 2.98$

| RATIO SPREAD | 5.93 |
|---|---|
| RATIO STEPS |  |
| REV/1 | -0.71 |
| 1/2 | 1.49 |
| 2/3 | 1.67 |
| 3/4 | 1.56 |
| 4/5 | 1.54 |

FAMILY OF FIVE-SPEED TRANSMISSION MECHANISMS HAVING THREE INTERCONNECTED PLANETARY GEAR SETS

BACKGROUND OF THE INVENTION

1. Field of the Invention

The present invention relates to a family of power transmissions having three planetary gear sets that are controlled by two clutches and two brakes to provide at least five forward speed ratios and one reverse speed ratio.

2. Background Art

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmission had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. Five-speed transmission are disclosed in U.S. Pat. Nos. 5,879,264; 5,984,825; 5,997,429; 6,007,450; and 6,056,665 issued to Raghavan, Hebbale and Usoro on Mar. 9, 1999; Nov. 16, 1999; Dec. 7, 1999; Dec. 28, 1999 and May 2, 2000, respectively; and U.S. Pat. No. 5,951,432 issued to Wehking, Hebbale, Raghavan and Usoro on Sep. 14, 1999. Six-speed transmission are disclosed in U.S. Pat. No. 4,070, 927 issued to Polak on Jan. 31, 1978; U.S. Pat. No. 6,071, 208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Five-speed transmissions offer several advantages over four-speed transmissions, including improved vehicle acceleration and improved fuel economy. While many trucks employ power transmissions, such as Polak, having six or more forward gear ratios, passenger cars are still manufactured with three- and four-speed automatic transmission and relatively few five or six-speed devices due to the size and complexity of these transmissions. The Raghavan, Hebbale, Usoro and Wehking patents employ two planetary gear sets, and five or six torque transmitting mechanisms to provide five forward speeds.

SUMMARY OF THE INVENTION

It is an object of the present invention to provide an improved family of transmissions having three planetary gear sets controlled to provide at least five forward speed ratios.

In one aspect of the present invention, the family of transmissions has three planetary gear sets, each of which includes a first, second and third member, which members may comprise a sun gear, a ring gear, or a planet carrier assembly member.

In another aspect of the present invention, each of the planetary gear sets may be of the single pinion-type or of the double pinion-type.

In yet another aspect of the present invention, a first interconnecting member continuously interconnects the first member of the first planetary gear set with the first member of the second planetary gear set.

In still another aspect of the invention, a second interconnecting member continuously interconnects the second member of the first planetary gear set with the second member of the second planetary gear set and with the first member of the third planetary gear set.

In yet a further aspect of the invention, each family member incorporates an input shaft which is continuously interconnected with a member of the third planetary gear set, and an output shaft which is continuously connected with another member of third planetary gear set.

In another aspect of the invention, a first clutch selectively interconnects a second member of the third planetary gear set, the input shaft, or the output shaft with a member of the first or second planetary gear sets.

In still a further aspect of the invention, a second clutch selectively interconnects a third member of the third planetary gear set, the input shaft, or the output shaft with the first interconnecting member or a member of the first or second planetary gear sets.

In a still further aspect of the invention, a first brake selectively interconnects a member of the first or second planetary gear sets with a transmission housing.

In a still further aspect of the invention, a second brake selectively interconnects a member of the first or second planetary gear sets or the first interconnecting member with the transmission housing.

In still another aspect of the invention, the two clutches and two brakes are selectively engageable in combinations of two to yield at least five forward speed ratios and one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart of some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention; and FIG. 6b is a truth table and chart depicting some of the operating characteristics of the powertrain shown in FIG. 6a.

DETAILED DESCRIPTION OF THE PREFERRED EMBODIMENTS

Figures 1A, 1B:
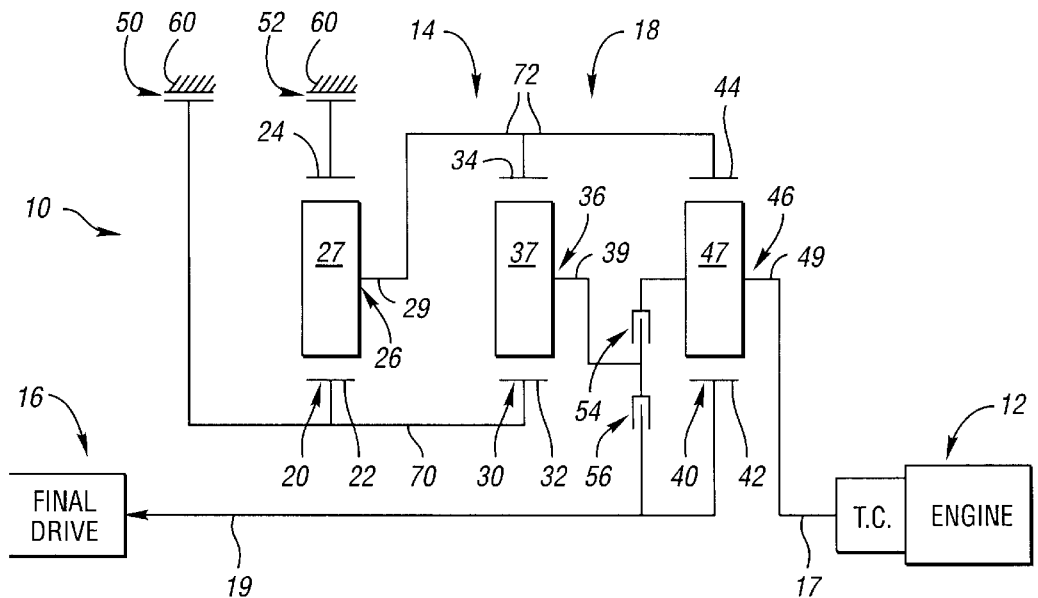

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement 18 also includes four torque transmitting mechanisms 50, 52, 54 and 56. The torque-transmitting mechanisms 50, 52 are stationary type torque-transmitting mechanisms, commonly termed brakes or reaction clutches. The torque-transmitting mechanisms 54, 56 are rotating type torque transmitting mechanisms, commonly termed clutches.

The input shaft 17 is continuously connected with the planet carrier assembly member 46, and the output shaft 19 is continuously connected with the sun gear member 42. The sun gear member 22 is continuously connected to sun gear member 32 through the interconnecting member 70. The planet carrier assembly member 26 is continuously connected to the ring gear members 34 and 44 through the interconnecting member 72.

A brake 50 selectively connects the sun gear member 22 with the transmission housing 60. A brake 52 selectively connects the ring gear member 24 to the transmission housing 60. A clutch 54 selectively connects the planet carrier assembly member 36 to the planet carrier assembly member 46. A clutch 56 selectively connects the planet carrier assembly member 36 to the sun gear member 42.

As shown in FIG. 1b, and in particular the truth table disclosed therein, the torque-transmitting mechanisms are selectively engaged in combinations of two to provide five forward speed ratios and a reverse speed ratio. It should also be noted in the truth table that the torque-transmitting mechanism 50 remains engaged through a neutral condition, thereby simplifying the forward/reverse interchange.

To establish the reverse speed ratio, the brake 50 and clutch 54 are engaged. The brake 50 connects the sun gear member 22 to the transmission housing 60, and the clutch 54 connects the planet carrier assembly member 36 to the planet carrier assembly member 46. The sun gear members 22 and 32 do not rotate. The planet carrier assembly member 26 rotates at the same speed as the ring gear members 34 and 44. The planet carrier assembly member 36 rotates at the same speed as the planet carrier assembly member 46 and the input shaft 17. The ring gear member 34 rotates at a speed determined by the speed of the planet carrier assembly member 36 and the ring gear/sun gear tooth ratio of the planetary gear set 30. The sun gear member 42 rotates at the same speed as the output shaft 19. The sun gear member 42 rotates at a speed determined by the speed of the ring gear member 44, the speed of the planet carrier assembly member 46, and the ring gear/sun gear tooth ratio of the planetary gear set 40. The numerical value of the reverse speed ratio is determined utilizing the ring gear/sun gear tooth ratios of the planetary gear sets 30 and 40.

The first forward speed ratio is established with the engagement of the brake 50 and the clutch 56. The brake 50 connects the sun gear member 22 to the transmission housing 60, and the clutch 56 connects the planet carrier assembly member 36 to the sun gear member 42. The sun gear members 22 and 32 do not rotate. The planet carrier assembly member 26 rotates at the same speed as the ring gear members 34 and 44. The planet carrier assembly member 36 rotates at the same speed as the sun gear member 42 and the output shaft 19. The planet carrier assembly member 36 rotates at a speed determined from the speed of the ring gear member 34 and the ring gear/sun gear tooth ratio of the planetary gear set 30. The planet carrier assembly member 46 rotates at the same speed as the input shaft 17. The sun gear member 42 rotates at a speed determined by the speed of the ring gear member 44, the speed of the planet carrier assembly member 46, and the ring gear/sun gear tooth ratio of the planetary gear set 40. The numerical value of the first forward speed ratio is determined utilizing the ring gear/sun gear tooth ratios of the planetary gear sets 30 and 40.

The second forward speed ratio is established with the engagement of the clutches 54 and 56. In this configuration, the input shaft 17 is directly connected to the output shaft 19. The numerical value of the second forward speed ratio is 1.

The third forward speed ratio is established with the engagement of the brake 52 and the clutch 56. The brake 52 connects the ring gear member 24 to the transmission housing 60, and the clutch 56 connects the planet carrier assembly member 36 to the sun gear member 42. The ring gear member 24 does not rotate. The sun gear member 22 rotates at the same speed as the sun gear member 32. The planet carrier assembly member 26 rotates at the same speed as the ring gear members 34 and 44. The planet carrier assembly member 26 rotates at a speed determined by the speed of the sun gear member 22 and the ring gear/sun gear tooth ratio of the planetary gear set 20. The planet carrier assembly member 36 rotates at the same speed as the sun gear member 42 and the output shaft 19. The planet carrier assembly member 36 rotates at a speed determined by the speed of the ring gear member 34, the speed of the sun gear member 32, and the ring gear/sun gear tooth ratio of the planetary gear set 30. The planet carrier assembly member 46 rotates at the same speed as the input shaft 17. The sun gear member 42 rotates at a speed determined by the speed of the ring gear member 44, the speed of the planet carrier assembly member 46, and the ring gear/sun gear tooth ratio of the planetary gear set 40. The numerical value of the third forward speed ratio is determined utilizing the ring gear/sun gear tooth ratios of the planetary gear sets 20, 30 and 40.

The fourth forward speed ratio is established with the engagement of the brake 52 and the clutch 54. The brake 52 connects the ring gear member 24 to the transmission housing 60, and the ring gear member 34 does not rotate. The clutch 54 connects the planet carrier assembly member 36 to the planet carrier assembly member 46. The sun gear member 22 rotates at the same speed as the sun gear member 32. The planet carrier assembly member 26 rotates at the same speed as the ring gear members 34 and 44. The planet carrier assembly member 26 rotates at a speed determined from the speed of the sun gear member 22 and the ring gear/sun gear tooth ratio of the planetary gear set 20. The planet carrier assembly members 36 and 46 rotate at the same speed as the input shaft 17. The planet carrier assembly member 36 rotates at a speed determined from the speed of the ring gear member 34, the speed of the sun gear member 32, and the ring gear/sun gear tooth ratio of the planetary gear set 30. The sun gear member 42 rotates at the same speed as the output shaft 19. The sun gear member 42 rotates at a speed determined by the speed of the ring gear member 44, the speed of the planet carrier assembly member 46, and the ring gear/sun gear tooth ratio of the planetary gear set 40. The numerical value of the fourth forward speed ratio is determined utilizing the ring gear/sun gear tooth ratios of the planetary gear sets 20, 30 and 40.

The fifth forward speed ratio is established with the engagement of the brakes 50 and 52. The brake 50 connects the sun gear member 22 to the transmission housing 60, and the brake 52 connects the ring gear member 24 to the transmission housing 60. In this configuration, the planetary gear sets 20 and 30 and ring gear member 44 do not rotate. The planet carrier assembly member 46 rotates at the same speed as the input shaft 17. The sun gear member 42 rotates at the same speed as the output shaft 19. The sun gear member 42 rotates at a speed determined by the speed of the planet carrier assembly member 46 and the ring gear/sun gear tooth ratio of the planetary gear set 40. The overall numerical value of the fifth forward speed ratio is determined utilizing the ring gear/sun gear tooth ratio of the planetary gear set 40.

As set forth above, the engagement schedules for the torque-transmitting mechanisms are shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40.

Also, the chart of FIG. 1b describes the ratio steps that are attained utilizing the sample of tooth ratios given. For example, the step ratio between the first and second forward ratios is 1.49, while the step ratio between the reverse and first forward ratio is −0.71. It can also be readily determined from the truth table of FIG. 1b that all of the single step forward ratio interchanges are of the single transition variety, as are the double step forward ratio interchanges.

Figures 2A, 2B:
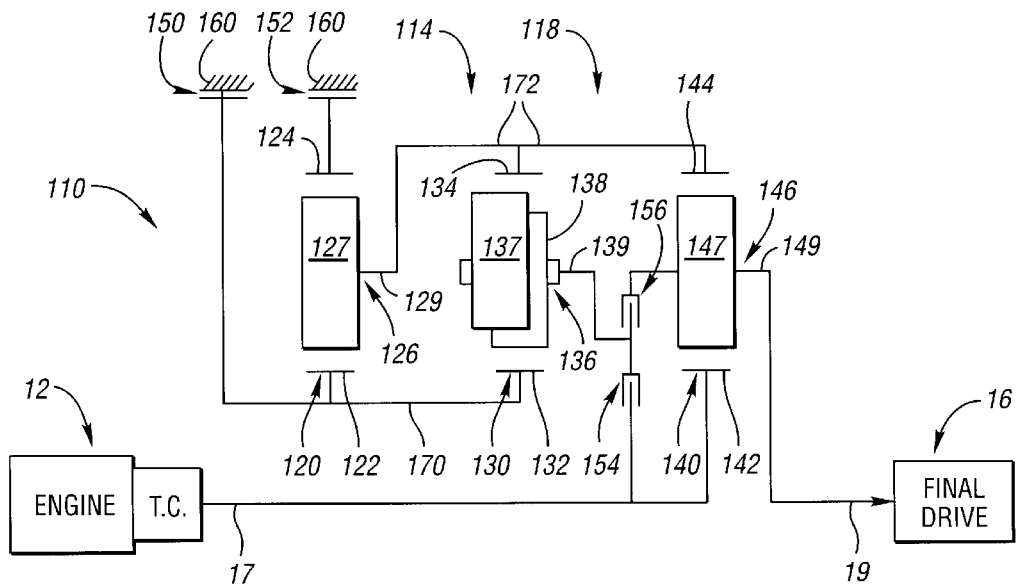

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 and 138 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes four torque transmitting mechanisms 150, 152, 154 and 156. The torque-transmitting mechanisms 150, 152 are stationary type torque-transmitting mechanisms, commonly termed brakes or reaction clutches. The torque-transmitting mechanisms 154, 156 are rotating type torque transmitting mechanisms, commonly termed clutches.

The input shaft 17 is continuously connected with the sun gear member 142, and the output shaft 19 is continuously connected with the planet carrier assembly member 146. The sun gear member 122 is continuously connected with the sun gear member 132 through the interconnecting member 170. The planet carrier assembly member 126 is continuously connected with the ring gear members 134 and 144 through the interconnecting member 172.

The sun gear member 122 is selectively connected with the transmission housing 160 through the brake 150. The ring gear member 124 is selectively connectable with the transmission housing 160 through the brake 152. The planet carrier assembly member 136 is selectively connectable with the sun gear member 142 through the clutch 154. The planet carrier assembly member 136 is selectively connectable with the planet carrier assembly member 146 through the clutch 156.

The truth table of FIG. 2b describes the engagement sequence utilized to provide five forward speed ratios and a reverse speed ratio in the planetary gear arrangement 118 shown in FIG. 2a.

To establish the reverse speed ratio, the brake 152 and clutch 154 are engaged. The brake 152 connects the ring gear member 124 to the transmission housing 160. The clutch 154 connects the planet carrier assembly member 136 to the sun gear member 142. The ring gear member 124 does not rotate. The planet carrier assembly member 126 rotates at the same speed as the ring gear members 134 and 144. The sun gear member 122 rotates at the same speed as the sun gear member 132. The planet carrier assembly member 126 rotates at a speed determined from the speed of the sun gear member 122 and the ring gear/sun gear tooth ratio of the planetary gear set 120. The planet carrier assembly member 136 rotates at the same speed as the sun gear member 142 and the input shaft 17. The ring gear member 134 rotates at a speed determined from the speed of the planet carrier assembly member 136, the speed of the sun gear member 132, and the ring gear/sun gear tooth ratio of the planetary gear set 130. The planet carrier assembly member 146 rotates at the same speed as the output shaft 19. The planet carrier assembly member 146 rotates at a speed determined from the speed of the ring gear member 144, the speed of the sun gear member 142, and the ring gear/sun gear tooth ratio of the planetary gear set 140. The overall numerical value of the reverse speed ratio is determined utilizing the ring gear/sun gear tooth ratios of the planetary gear sets 120, 130 and 140.

The first forward speed ratio is established with the engagement of the brake 152 and clutch 156. The brake 152 connects the ring gear member 124 to the transmission housing 160, and the clutch 156 connects the planet carrier assembly member 136 to the planet carrier assembly member 146. The ring gear member 124 does not rotate. The sun gear member 122 rotates at the same speed as the sun gear member 132. The planet carrier assembly member 126 rotates at the same speed as the ring gear members 134 and 144. The planet carrier assembly member 126 rotates at a speed determined from the speed of the sun gear member 122 and the ring gear/sun gear tooth ratio of the planetary gear set 120. The planet carrier assembly member 136 rotates at the same speed as the planet carrier assembly member 146 and the output shaft 19. The planet carrier assembly member 136 rotates at a speed determined from the speed of the ring gear member 134, the speed of the sun gear member 132, and the ring gear/sun gear tooth ratio of the planetary gear set 130. The sun gear member 142 rotates at the same speed as the input shaft 17. The planet carrier assembly member 146, and therefore the output shaft 19, rotates at a speed determined from the speed of the ring gear member 144, the speed of the sun gear member 142, and the ring gear/sun gear tooth ratio of the planetary gear set 140. The overall numerical value of the first forward speed ratio is determined utilizing the ring gear/sun gear tooth ratios of the planetary gear sets 120, 130 and 140.

The second forward speed ratio is established with the engagement of the brakes 150 and 152. The brake 150 connects the sun gear member 122 to the transmission housing 160, and the brake 152 connects the ring gear member 124 to the transmission housing 160. In this configuration, the planetary gear sets 120 and 130 and ring gear member 144 do not rotate. The planet carrier assembly member 146 rotates at the same speed as the output shaft 19. The sun gear member 142 rotates at the same speed as the input shaft 17. The planet carrier assembly member 146 rotates at a speed determined from the speed of the sun gear member 142 and the ring gear/sun gear tooth ratio of the planetary gear set 140. The overall numerical value of the second forward speed ratio is determined utilizing the ring gear/sun gear tooth ratio of the planetary gear set 140.

The third forward speed ratio is established with the engagement of the brake 150 and clutch 156. The brake 150 connects the sun gear member 122 to the transmission housing 160, and the clutch 156 connects the planet carrier assembly member 136 to the planet carrier assembly member 146. The sun gear members 122 and 132 do not rotate. The planet carrier assembly member 126 rotates at the same speed as the ring gear members 134 and 144. The planet carrier assembly member 136 rotates at the same speed as the planet carrier assembly member 146 and the output shaft 19. The planet carrier assembly member 136 rotates at a speed determined from the speed of the ring gear member 134 and the ring gear/sun gear tooth ratio of the planetary gear set 130. The sun gear member 142 rotates at the same speed as the input shaft 17. The planet carrier assembly member 146, and therefore the output shaft 19, rotates at a speed determined from the speed of the ring gear member 144, the speed of the sun gear member 142, and the ring gear/sun gear tooth ratio of the planetary gear set 140. The overall numerical value of the third forward speed ratio is determined utilizing the ring gear/sun gear tooth ratios of the planetary gear sets 130 and 140.

The fourth forward speed ratio is established with the engagement of the brake 150 and clutch 154. The brake 150 connects the sun gear member 122 to the transmission housing 160, and the clutch 154 connects the planet carrier assembly member 136 to the sun gear member 142. Sun gear members 122 and 132 do not rotate. The planet carrier assembly member 126 rotates at the same speed as the ring gear members 134 and 144. The planet carrier assembly member 136 rotates at the same speed as the sun gear member 142 and the input shaft 17. The ring gear member 134 rotates at a speed determined from the speed of the planet carrier assembly member 136 and the ring gear/sun gear tooth ratio of the planetary gear set 130. The planet carrier assembly member 146 rotates at the same speed as the output shaft 19. The speed of the planet carrier assembly member 146 is determined from the speed of the ring gear member 144, the speed of the sun gear member 142, and the ring gear/sun gear tooth ratio of the planetary gear set 140. The overall numerical value of the fourth forward speed ratio is determined utilizing the ring gear/sun gear tooth ratios of the planetary gear sets 130 and 140.

The fifth forward speed ratio is established with the engagement of the clutches 154 and 156. In this configuration, the input shaft 17 is directly connected to the output shaft 19. The numerical value of the fifth forward speed ratio is 1.

As set forth above, the truth table of FIG. 2b describes the engagement sequence of the torque transmitting mechanisms utilized to provide a reverse drive ratio and five forward speed ratios. It can be readily determined from the truth table that all the single step forward interchanges are of the single transition type, as are the double step forward interchanges. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first forward speed ratio step. For example, the first to second step ratio is 1.66.

Figures 3A, 3B:
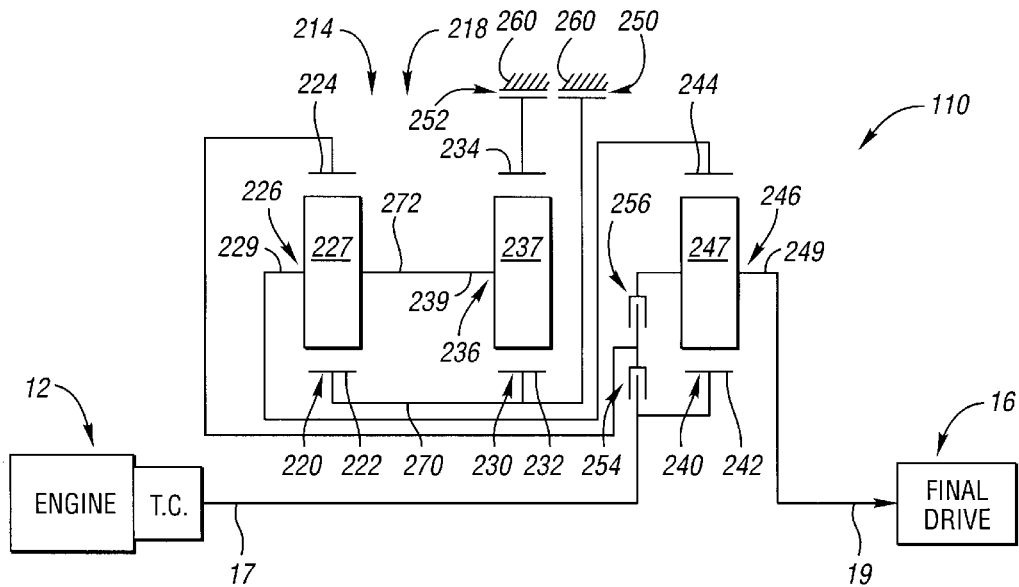

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes four torque transmitting mechanisms 250, 252, 254 and 256. The torque-transmitting mechanisms 250, 252 are stationary type torque-transmitting mechanisms, commonly termed brakes or reaction clutches. The torque-transmitting mechanisms 254, 256 are rotating type torque transmitting mechanisms, commonly termed clutches.

The input shaft 17 is continuously connected with the sun gear member 242, and the output shaft 19 is continuously connected with the planet carrier assembly member 246. The sun gear member 222 is continuously connected with the sun gear member 232 through the interconnecting member 270. The planet carrier assembly member 226 is continuously connected to the planet carrier assembly member 236 and to the ring gear member 244 through the interconnecting member 272.

The sun gear member 232 is selectively connectable with the transmission housing 260 through the brake 250. The ring gear member 234 is selectively connectable with the transmission housing 260 through the brake 252. The ring gear member 224 is selectively connectable with the sun gear member 242 through the clutch 254. The ring gear member 224 is selectively connectable with the planet carrier assembly member 246 through the clutch 256.

As shown in the truth table in FIG. 3b, the torque transmitting mechanisms are engaged in combinations of two to establish five forward speed ratios and one reverse ratio. It should be also noted that the torque transmitting mechanism 252 can remain engaged through the neutral condition, thereby simplifying the forward/reverse interchange.

To establish the reverse speed ratio, the brake 252 and clutch 254 are engaged. The brake 252 connects the ring gear member 234 to the transmission housing 260, and the clutch 254 connects the ring gear member 224 to the sun gear member 242. The ring gear member 224 rotates at the same speed as the sun gear member 242 and the input shaft 17. The sun gear member 222 rotates at the same speed as the sun gear member 232. The planet carrier assembly member 226 rotates at the same speed as the planet carrier assembly member 236 and the ring gear member 244. The planet carrier assembly member 226 rotates at a speed determined from the speed of the ring gear member 224, the speed of the sun gear member 222, and the ring gear/sun gear tooth ratio of the planetary gear set 220. The ring gear member 234 does not rotate. The planet carrier assembly member 236 rotates at a speed determined from the speed of the sun gear member 232 and the ring gear/sun gear tooth ratio of the planetary gear set 230. The planet carrier assembly member 246 rotates at the same speed as the output shaft 19. The planet carrier assembly member 246 rotates at a speed determined from the speed of the ring gear member 244, the speed of the sun gear member 242, and the ring gear/sun gear tooth ratio of the planetary gear set 240. The overall numerical value of the reverse speed ratio is determined utilizing the ring gear/sun gear tooth ratios of the planetary gear sets 220, 230 and 240.

The first forward speed ratio is established with the engagement of the brake 252 and clutch 256. The brake 252 connects the ring gear member 234 to the transmission housing 260, and the clutch 256 connects the ring gear member 224 to the planet carrier assembly member 246. The ring gear member 224 rotates at the same speed as the planet carrier assembly member 246 and the output shaft 19. The sun gear member 222 rotates at the same speed as the sun gear member 232. The planet carrier assembly member 226 rotates at the same speed as the planet carrier assembly member 236 and the ring gear member 244. The planet carrier assembly member 226 rotates at a speed determined from the speed of the ring gear member 224, the speed of the sun gear member 222, and the ring gear/sun gear tooth ratio of the planetary gear set 220. The ring gear member 234 does not rotate. The planet carrier assembly member 236 rotates at a speed determined from the speed of the sun gear member 232 and the ring gear/sun gear tooth ratio of the planetary gear set 230. The sun gear member 242 rotates at the same speed as the input shaft 17. The planet carrier assembly member 246, and therefore the output shaft 19, rotates at a speed determined from the speed of the ring gear member 244, the speed of the sun gear member 242, and the ring gear/sun gear tooth ratio of the planetary gear set 240. The overall numerical value of the first forward speed ratio is determined utilizing the ring gear/sun gear tooth ratios of the planetary gear sets 220, 230 and 240.

The second forward speed ratio is established with the engagement of the brakes 250 and 252. The brake 250 connects the sun gear member 232 to the transmission housing 260, and the brake 252 connects the ring gear member 234 to the transmission housing 260. The sun gear members 222 and 232 do not rotate. The planet carrier assembly member 226 rotates at the same speed as the planet carrier assembly member 236 and the ring gear member 244. The ring gear member 234 does not rotate. The sun gear member 242 rotates at the same speed as the input shaft 17. The planet carrier assembly member 246, and therefore the output shaft 19, rotates at a speed determined from the speed of the ring gear member 244, the speed of the sun gear member 242, and the ring gear/sun gear tooth ratio of the planetary gear set 240. The overall numerical value of the second forward speed ratio is determined utilizing the ring gear/sun gear tooth ratio of the planetary gear set 240.

The third forward speed ratio is established with the engagement of the brake 250 and the clutch 256. The brake 250 connects the sun gear member 232 to the transmission housing 260, and the clutch 256 connects the ring gear member 224 to the planet carrier assembly member 246. Accordingly, the ring gear member 224 rotates at the same speed as the planet carrier assembly member 246 and the output shaft 19. The sun gear members 222 and 232 do not rotates. The planet carrier assembly member 226 rotates at the same speed as the planet carrier assembly member 236 and the ring gear member 244. The planet carrier assembly member 226 rotates at a speed determined from the speed of the ring gear member 224 and the ring gear/sun gear tooth ratio of the planetary gear set 220. The sun gear member 242 rotates at the same speed as the input shaft 17. The planet carrier assembly member 246, and therefore the output shaft 19, rotates at a speed determined from the speed of the ring gear member 244, the speed of the sun gear member 242, and the ring gear/sun gear tooth ratio of the planetary gear set 240. The overall numerical value of the third forward speed ratio is determined utilizing the ring gear/sun gear tooth ratios of the planetary gear sets 220 and 240.

The fourth forward speed ratio is established with the engagement of the brake 250 and the clutch 254. The brake 250 connects the sun gear member 232 to the transmission housing 260, and the clutch 254 connects the ring gear member 224 to the sun gear member 242. Accordingly, the ring gear member 224 rotates at the same speed as the sun gear member 242 and the input shaft 17. The sun gear members 222 and 232 do not rotate. The planet carrier assembly member 226 rotates at the same speed as the planet carrier assembly member 236 and the ring gear member 244. The planet carrier assembly member 226 rotates at a speed determined from the speed of the ring gear member 224 and the ring gear/sun gear tooth ratio of the planetary gear set 220. The planet carrier assembly member 246, and therefore the output shaft 19, rotates at a speed determined from the speed of the ring gear member 244, the speed of the sun gear member 242, and the ring gear/sun gear tooth ratio of the planetary gear set 240. The overall numerical value of the fourth forward speed ratio is determined utilizing the ring gear/sun gear tooth ratios of the planetary gear sets 220 and 240.

The fifth forward speed ratio is established with the engagement of the clutches 254 and 256. In this configuration, the input shaft 17 is directly connected to the output shaft 19. The numerical value of the fifth forward speed ratio is 1.

As previously set forth, the truth table of FIG. 3b describes the combinations of engagements utilized for the five forward speed ratios and reverse speed ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse to first forward speed ratio. For example, the first to second ratio interchange has a step of 1.66. It can also be readily determined from the truth table of FIG. 3b that all of the single step forward ratio interchanges are of the single transition variety, as are all of the double step forward interchanges.

Figures 4A, 4B:
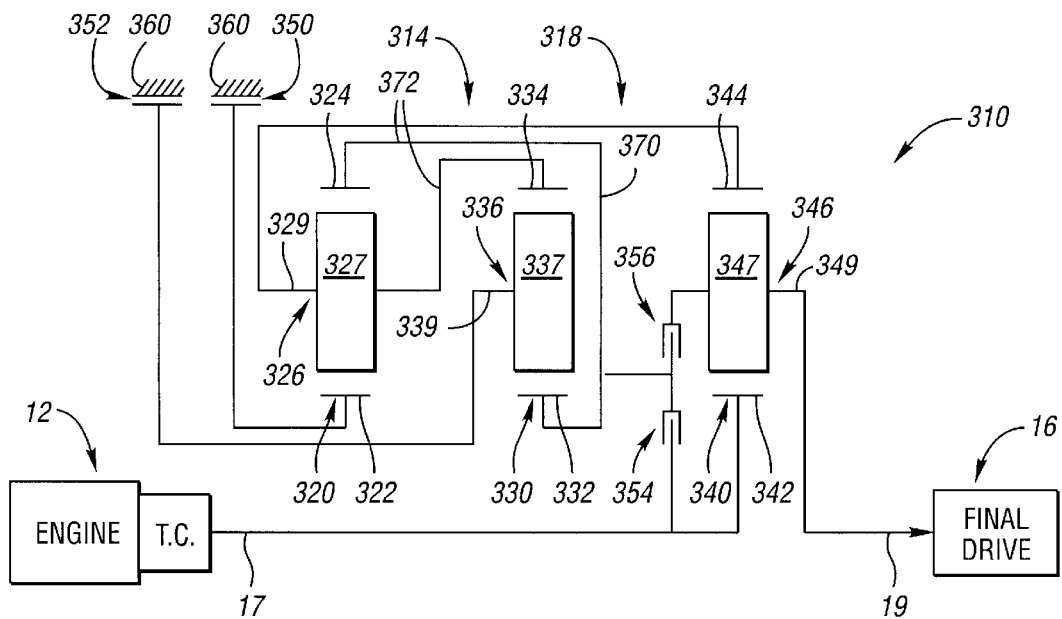

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes four torque transmitting mechanisms 350, 352, 354 and 356. The torque-transmitting mechanisms 350, 352 are stationary type torque-transmitting mechanisms, commonly termed brakes or reaction clutches. The torque-transmitting mechanisms 354, 356 are rotating type torque transmitting mechanisms, commonly termed clutches.

The input shaft 17 is continuously connected with the sun gear member 342, and the output shaft 19 is continuously connected with the planet carrier assembly member 346. The ring gear member 324 is continuously connected with the sun gear member 332 through the interconnecting member 370. The planet carrier assembly member 326 is continuously connected with the ring gear members 334 and 344 through the interconnecting member 372.

The sun gear member 322 is selectively connectable with the transmission housing 360 through the brake 350. The planet carrier assembly member 336 is selectively connectable with the transmission housing 360 through the brake 352. The sun gear member 332 is selectively connectable with the sun gear member 342 through the clutch 354. The sun gear member 332 is selectively connectable with the planet carrier assembly member 346 through the clutch 356.

Figures 5A, 5B:
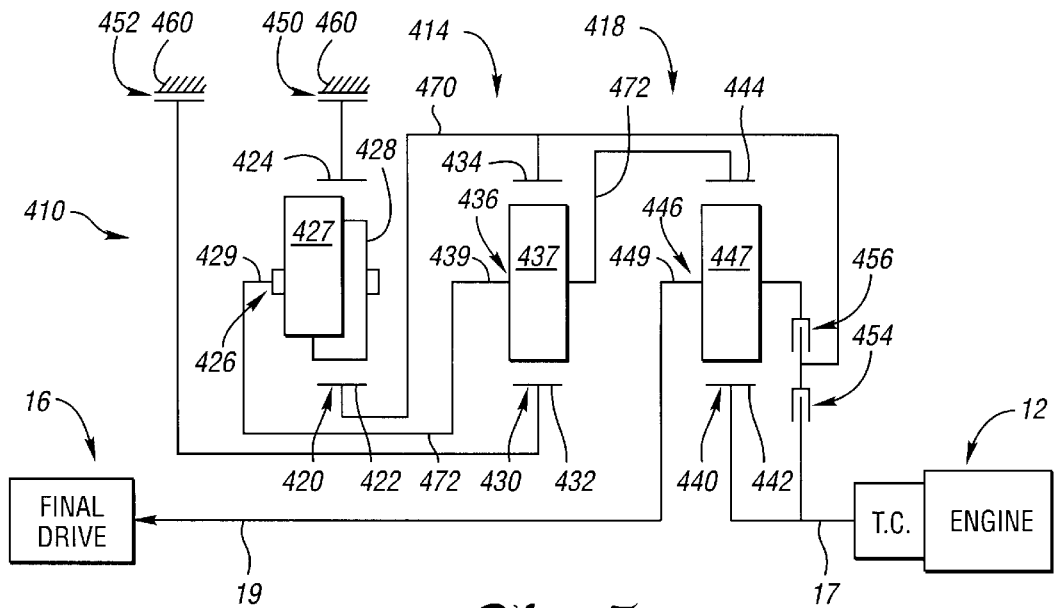
Figures 6A, 6B:
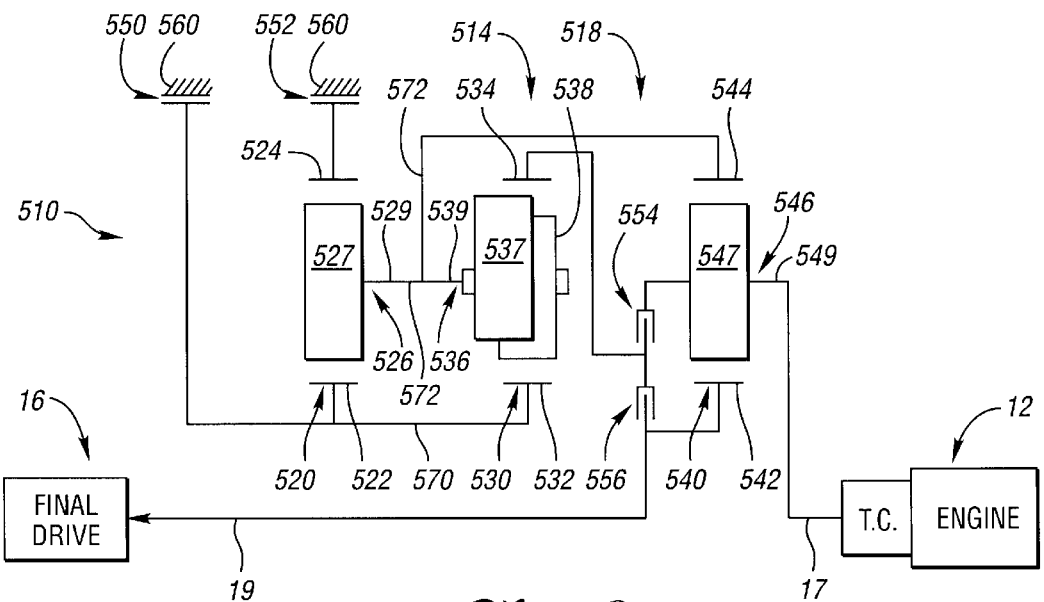

The truth tables given in FIGS. 4b, 5b and 6b show the engagement sequences for the torque transmitting mechanisms to provide at least five forward speed ratios and one reverse speed ratio. As shown and described for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and the five forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.47. It can be readily determined from the truth table of FIG. 4b that each of the forward single step ratio interchanges is a single transition shift, as are the double step interchanges. The chart also shows that the torque transmitting mechanism 352 can be engaged through the neutral condition to simplify the forward/reverse interchange.

Those skilled in the art will recognize that the numerical values of the reverse and first forward speed ratios are determined utilizing the ring gear/sun gear tooth ratios of the planetary gear sets 330 and 340. The numerical value of the second forward speed ratio is determined utilizing the ring gear/sun gear tooth ratio of the planetary gear set 340. The numerical values of the third and fourth forward speed ratios are determined utilizing the ring gear/sun gear tooth ratios of the planetary gear sets 320 and 340. The numerical value of the fifth forward speed ratio is 1.

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 and 428 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes four torque transmitting mechanisms 450, 452, 454 and 456. The torque-transmitting mechanisms 450, 452 are stationary type torque-transmitting mechanisms, commonly termed brakes or reaction clutches. The torque transmitting mechanisms 454, 456 are rotating type torque transmitting mechanisms, commonly termed clutches.

The input shaft 17 is continuously connected with the sun gear member 442, and the output shaft 19 is continuously connected with the planet carrier assembly member 446. The sun gear member 422 is continuously connected with the ring gear member 434 through the interconnecting member 470. The planet carrier assembly member 426 is continuously connected with the planet carrier assembly member 436 and the ring gear member 444 through the interconnecting member 472.

The ring gear member 424 is selectively connectable with the transmission housing 460 through the brake 450. The sun gear member 432 is selectively connectable with the transmission housing 460 through the brake 452. The sun gear member 442 is selectively connectable with the ring gear member 434 through the clutch 454. The planet carrier assembly member 446 is selectively connectable with the ring gear member 434 through the clutch 456.

The truth table shown in FIG. 5b describes the engagement combination and sequence of the torque transmitting mechanisms 450, 452, 454 and 456 that are employed to provide the reverse drive ratio and the five forward speed ratios. It should be noted that the torque transmitting mechanism 450 is engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts, as are the double step interchanges in the forward direction.

FIG. 5b also provides a chart of the ratio steps between adjacent forward ratios and between the reverse and first forward speed ratio. For example, the ratio step between the first and second forward speed ratios is 1.47.

Those skilled in the art will recognize that the numerical values of the reverse and first forward speed ratios are determined utilizing the ring gear/sun gear tooth ratios of the planetary gear sets 420 and 440. The numerical value of the second forward speed ratio is determined utilizing the ring gear/sun gear tooth ratio of the planetary gear set 440. The numerical values of the third and fourth forward speed ratios are determined utilizing the ring gear/sun gear tooth ratios of the planetary gear sets 430 and 440. The numerical value of the fifth forward speed ratio is 1.

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 and 538 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes four torque transmitting mechanisms 550, 552, 554 and 556. The torque-transmitting mechanisms 550, 552 are stationary type torque-transmitting mechanisms, commonly termed brakes or reaction clutches. The torque-transmitting mechanisms 554, 556 are rotating type torque transmitting mechanisms, commonly termed clutches.

The input shaft 17 is continuously connected with the planet carrier assembly member 546, and the output shaft 19 is continuously connected with the sun gear member 542. The sun gear member 522 is continuously connected with the sun gear member 532 through the interconnecting member 570. The planet carrier assembly member 526 is continuously connected with the planet carrier assembly member 536 and the ring gear member 544 through the interconnecting member 572.

The sun gear member 522 is selectively connectable with the transmission housing 560 through the brake 550. The ring gear member 524 is selectively connectable with the transmission housing 560 through the brake 552. The ring gear member 534 is selectively connectable with the planet carrier assembly member 546 through the clutch 554. The ring gear member 534 is selectively connectable with the sun gear member 542 through the clutch 556.

The truth table shown in FIG. 6b describes the engagement sequence and combination of the torque transmitting mechanisms to provide the reverse speed ratio and five forward speed ratios. It should be noted that the torque transmitting mechanism 550 can remain engaged through the neutral condition, thereby simplifying the forward/reverse interchange. It can also be determined from the truth table of FIG. 6b that all of the single step forward ratio interchanges are of the single transition variety, as are all of the double step forward interchanges. The chart of FIG. 6b describes the ratio steps between adjacent forward speed ratios and the ratio step between the reverse and first forward speed ratio.

Those skilled in the art, upon reviewing the truth table and the schematic representation of FIG. 6a, can determine that the numerical values of the reverse and first forward speed ratios are determined utilizing the ring gear/sun gear tooth ratios of the planetary gear sets 530 and 540. The numerical value of the second forward speed ratio is 1. The numerical values of the third and fourth forward speed ratios are determined utilizing the ring gear/sun gear tooth ratios of the planetary gear sets 520, 530 and 540. The numerical value of the fifth forward speed ratio is determined utilizing the ring gear/sun gear tooth ratio of the planetary gear set 540.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   first, second and third planetary gear sets each having first, second and third members;
   said input shaft being continuously interconnected with said first member of said third planetary gear set, said output shaft being continuously interconnected with said second member of said third planetary gear set;
   a first interconnecting member continuously interconnecting said first member of said first planetary gear set with said first member of said second planetary gear set;
   a second interconnecting member continuously interconnecting said second member of said first planetary gear set with said second member of said second planetary gear set and with said third member of said third planetary gear set;
   a first clutch selectively interconnecting said first member of said third planetary gear set, with a member of said first or second planetary gear sets;
   a second clutch selectively interconnecting said second member of said third planetary gear set, with said member of said first or second planetary gear sets connected with said first clutch;
   a first brake selectively interconnecting a transmission housing with another member of said first or second planetary gear set;
   a second brake selectively interconnecting said transmission housing with yet another member of said first or second planetary gear sets; and
   said first and second clutches and said first and second brakes being engaged in combinations of two to establish at least five forward speed ratios and a reverse speed ratio between said input shaft and said output shaft.

2. The transmission defined in claim 1, wherein planet carrier assembly members of each of said planetary gear sets are of the single-pinion type.

3. The transmission defined in claim 1, wherein a planet carrier assembly member of at least one of said planetary gear sets is of the double-pinion type.

4. A multi-speed transmission comprising:
   an input shaft;
   an output shaft;
   a planetary gear arrangement having first, second and third planetary gear sets, each planetary gear set having first, second and third members;
   said input shaft being continuously interconnected with said first member of the third planetary gear set, said output shaft being continuously interconnected with said second member of the third planetary gear set;
   a first interconnecting member continuously interconnecting said first member of said first planetary gear set with said first member of said second planetary gear set;
   a second interconnecting member continuously interconnecting said second member of said first planetary gear set with said second member of said second planetary gear set and with said third member of said third planetary gear set; and
   two brakes and two clutches for selectively interconnecting said members of said planetary gear sets, and a transmission housing in combinations of two to establish at least five forward speed ratios and one reverse speed ratio between said input shaft and said output shaft.

5. The transmission defined in claim 4, wherein a first of said two clutches is selectively operable for interconnecting said first member of said third planetary gear set, with said first or third member of said first or second planetary gear sets.

6. The transmission defined in claim 4, wherein a second of said two clutches is selectively operable for interconnecting said second member of said third planetary gear set, with said member of said first or second planetary gear sets, connected with said first clutch.

7. The transmission defined in claim 4, wherein a first of said two brakes is selectively operable for interconnecting said transmission housing with said first or third member of said first or second planetary gear sets not connected with said clutches.

8. The transmission defined in claim 4, wherein a second of said two brakes is selectively operable for interconnecting said transmission housing with said first or third member of said first or second planetary gear sets not connected with the first of said two brakes or said clutches.

9. The transmission defined in claim 4, wherein planet carrier assembly members of each of said planetary gear sets are of the single-pinion type.

10. The transmission defined in claim 4, wherein a planet carrier assembly member of at least one of said planetary gear sets is of the double-pinion tape.

11. A multi-speed transmission comprising:

an input shaft;

an output shaft;

first, second and third planetary gear sets each having first, second and third members;

said input shaft being continuously interconnected with said first member of said third planetary gear set, said output shaft being continuously interconnected with said second member of said third planetary gear set;

a first interconnecting member continuously interconnecting said first member of said first planetary gear set with said first member of said second planetary gear set;

a second interconnecting member continuously interconnecting said second member of said first planetary gear set with said second member of said second planetary gear set and with said third member of said third planetary gear set;

first and second clutches and first and second brakes being selectively engageable in pairs to establish combinations of members joined for common rotation to provide five forward speed ratios and a reverse speed ratio between said input shaft and said output shaft, said combinations including either:

an engaged combination with said first clutch selectively interconnecting said third member of said second planetary gear set with said first member of said third planetary gear set, said second clutch selectively interconnecting said third member of said second planetary gear set with said second member of said third planetary gear set, said first brake selectively interconnecting said first member of said first planetary gear set with said transmission housing, and said second brake selectively interconnecting said third member of said first planetary gear set with said transmission housing; or an engaged combination with said first clutch selectively interconnecting said third member of said second planetary gear set with said first member of said third planetary gear set, said second clutch selectively interconnecting said third member of said second planetary gear set with said second member of said third planetary gear set, said first brake selectively interconnecting said first member of said first planetary gear set with said transmission housing, and said second brake selectively interconnecting said third member of said first planetary gear set with said transmission housing; or an engaged combination with said first clutch selectively interconnecting said third member of said first planetary gear set with said first member of said third planetary gear set, said second clutch selectively interconnecting said third member of said first planetary gear set with said second member of said third planetary gear set, said first brake selectively interconnecting said third member of said second planetary gear set with said transmission housing, and said second brake selectively interconnecting said first member of said second planetary gear set with said transmission housing; or an engaged combination with said first clutch selectively interconnecting said first member of said second planetary gear set with said first member of said third planetary gear set, said second clutch selectively interconnecting said first member of said second planetary gear set with said second member of said third planetary gear set, said first brake selectively interconnecting said third member of said first planetary gear set with said transmission housing, and said second brake selectively interconnecting said third member of said second planetary gear set with said transmission housing; or an engaged combination with said first clutch selectively interconnecting said first member of said second planetary gear set with said first member of said third planetary gear set, said second clutch selectively interconnecting said second member of said third planetary gear set with said first member of said second planetary gear set, said first brake selectively interconnecting said third member of said first planetary gear set with said transmission housing, and said second brake selectively interconnecting said third member of said second planetary gear set with said transmission housing; or an engaged combination with said first clutch selectively interconnecting said third member of said second planetary gear set with said first member of said third planetary gear set, said second clutch selectively interconnecting said third member of said second planetary gear set with said second member of said third planetary gear set, said first brake selectively interconnecting said first member of said first planetary gear set with said transmission housing, and said second brake selectively interconnecting said third member of said first planetary gear set with said transmission housing.

* * * * *